United States Patent
Eisner

(10) Patent No.: US 10,318,492 B2
(45) Date of Patent: Jun. 11, 2019

(54) PREDICTIVE STORAGE SERVICE

(71) Applicant: Amazon Technologies, Inc., Reno, NV (US)

(72) Inventor: Noah Anthony Eisner, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/776,498

(22) Filed: Feb. 25, 2013

(65) Prior Publication Data

US 2014/0244580 A1    Aug. 28, 2014

(51) Int. Cl.
*G06F 16/182* (2019.01)
*G06F 16/178* (2019.01)

(52) U.S. Cl.
CPC ........ *G06F 16/1824* (2019.01); *G06F 16/178* (2019.01)

(58) Field of Classification Search
None
See application file for complete search history.

(56) References Cited

U.S. PATENT DOCUMENTS

| | | | |
|---|---|---|---|
| 6,301,579 B1 | 10/2001 | Becker | |
| 6,834,120 B1 | 12/2004 | Leclerc et al. | |
| 7,233,933 B2 | 6/2007 | Horvitz et al. | |
| 2007/0071209 A1* | 3/2007 | Horvitz | G06Q 10/109 379/201.06 |
| 2007/0276723 A1 | 11/2007 | Samid | |
| 2009/0150569 A1 | 6/2009 | Kumar et al. | |
| 2009/0171960 A1* | 7/2009 | Katzir | H04L 63/30 |
| 2009/0254572 A1 | 10/2009 | Redlich et al. | |
| 2010/0027588 A1* | 2/2010 | O'Shea et al. | 375/147 |
| 2010/0169273 A1* | 7/2010 | Callanan et al. | 707/609 |
| 2010/0262796 A1* | 10/2010 | Camborde | G06F 11/1451 711/162 |
| 2010/0332479 A1* | 12/2010 | Prahlad et al. | 707/741 |
| 2011/0087700 A1 | 4/2011 | Lo et al. | |

(Continued)

FOREIGN PATENT DOCUMENTS

| | | |
|---|---|---|
| CN | 1831817 | 9/2006 |
| CN | 102687507 | 9/2012 |

(Continued)

OTHER PUBLICATIONS

"Registry"; Free On-Line Dictionary of Computing; published on: Jan. 20, 2008; retrieved on Sep. 26, 2015 from: http://foldoc.org/registry.*

(Continued)

*Primary Examiner* — Tony Mahmoudi
*Assistant Examiner* — Umar Mian
(74) *Attorney, Agent, or Firm* — Kilpatrick Townsend & Stockton LLP

(57) ABSTRACT

A predictive storage application selectively determines files from a computing system to send to a predictive storage service that makes the files available for use in another computing system. The predictive storage application may receive events indicating a use of files. The predictive storage application may determine that a file has enough importance and send it to a predictive storage service. Other aspects of the disclosure are described in the detailed description, figures, and claims.

30 Claims, 9 Drawing Sheets

(56) References Cited

U.S. PATENT DOCUMENTS

| | | | |
|---|---|---|---|
| 2011/0107042 A1* | 5/2011 | Herron | 711/161 |
| 2011/0173299 A1 | 7/2011 | Lightstone et al. | |
| 2012/0143806 A1 | 6/2012 | Sundelin et al. | |
| 2012/0167180 A1* | 6/2012 | Lee et al. | 726/4 |
| 2012/0197829 A1 | 8/2012 | Nori et al. | |
| 2013/0212067 A1* | 8/2013 | Piasecki et al. | 707/620 |
| 2013/0305039 A1* | 11/2013 | Gauda | 713/153 |
| 2013/0318194 A1* | 11/2013 | Timbs | 709/213 |
| 2014/0171064 A1* | 6/2014 | Das | 455/426.1 |
| 2014/0172793 A1* | 6/2014 | Stritzel | G06F 17/30575 707/634 |
| 2014/0188803 A1* | 7/2014 | James et al. | 707/638 |
| 2014/0229447 A1* | 8/2014 | Aslot et al. | 707/688 |

FOREIGN PATENT DOCUMENTS

| | | |
|---|---|---|
| CN | 102857570 | 1/2013 |
| JP | 2012230598 | 11/2002 |
| JP | 2008301248 | 12/2008 |
| JP | 2007087349 | 4/2017 |
| WO | 2012048619 | 4/2012 |

OTHER PUBLICATIONS

PCT Application No. PCT/US2014/018416, International Search Report and Written Opinion, dated Jul. 9, 2014.

File Hosting Service. Datasheet [online]. Wikipedia, 2012 [retrieved on Dec. 20, 2012]. Retrieved from the Internet: <URL: http://en.wikipedia.org/wiki/File_hosting_service>.

SG11201506528U, Written Opinion, dated Dec. 23, 2015, 12 pages.

EP14754387.0 , "Extended European Search Report", dated Jul. 6, 2016, 8 pages.

KR10-2015-7024650 , "Office Action", dated Jun. 15, 2016, 6 pages.

Sinitsyn , "A Synchronization Framework for Personal Mobile Servers", *Pervasive Computing and Communications Workshops (PERCOMW'04)*. Proceedings of the Second IEEE Annual Conference, Piscataway, NJ, USA, IEEE, (Mar. 14, 2004) pp. 208-212.

AU2014218538 , "First Examiner Report", dated Apr. 13, 2016, 2 pages.

CA2,901,677 , Office Action, dated Oct. 24, 2016, 7 pages.

JP2015-559283, "Office Action", dated Dec. 12, 2016, 4 pages.

CA2,901,677 , "Office Action", dated Aug. 28, 2017, 6 pages.

KR10-2017-7001430 , "Notice of Decision to Grant", dated Aug. 21, 2017, 4 pages.

AU2016222323 , "First Examination Report", dated Apr. 27, 2017, 3 pages.

JP2015-559283 , "Office Action", dated Mar. 21, 2017, 4 pages.

KR10-2017-7001430 , "Office Action", dated Apr. 19, 2017, 13 pages.

CN201480013012.6 , "Office Action", dated Dec. 28, 2017, 15 Pages.

JP2017-120081 , "Office Action", dated Jan. 15, 2018, 9 pages.

SG10201609089S , "Written Opinion", dated Oct. 16, 2017, 10 pages.

CA2,901,677 , "Office Action", dated Apr. 30, 2018, 4 pages.

JP2017-120081 , "Office Action", dated Jun. 18, 2018, 6 pages.

EP14754387.0 , "Office Action", dated Dec. 14, 2018, 5 pages.

JP2017-120081 , "Notice of Decision to Grant", dated Jan. 15, 2019, 6 pages.

\* cited by examiner

PREDICTIVE STORAGE SERVICE

BACKGROUND

Documents have become an important part of workflow, where they serve various functions, such as tracking, informing, teaching and payment functions. For example, kids and teachers work on handouts and reports. In another example, a mechanic tracks parts, labor and completion during a repair. Use of these documents may allow a workflow to continue because a state of the workflow may be reflected in the documents.

As documents and content are constructed, people are increasingly reviewing and editing content on various devices. For example, an executive emails the latest spreadsheets with key business indicators to herself so that she may review the spreadsheet on her smartphone. In another example, a legal secretary puts files on a USB-drive to give to an attorney to review on a laptop while travelling. In yet another example, an artist saves assets and work-in-progress in a pre-identified folder that synchronizes changes to a remote server.

BRIEF DESCRIPTION OF THE DRAWINGS

Various embodiments in accordance with the present disclosure will be described with reference to the drawings, in which.

DETAILED DESCRIPTION

Figure 1:
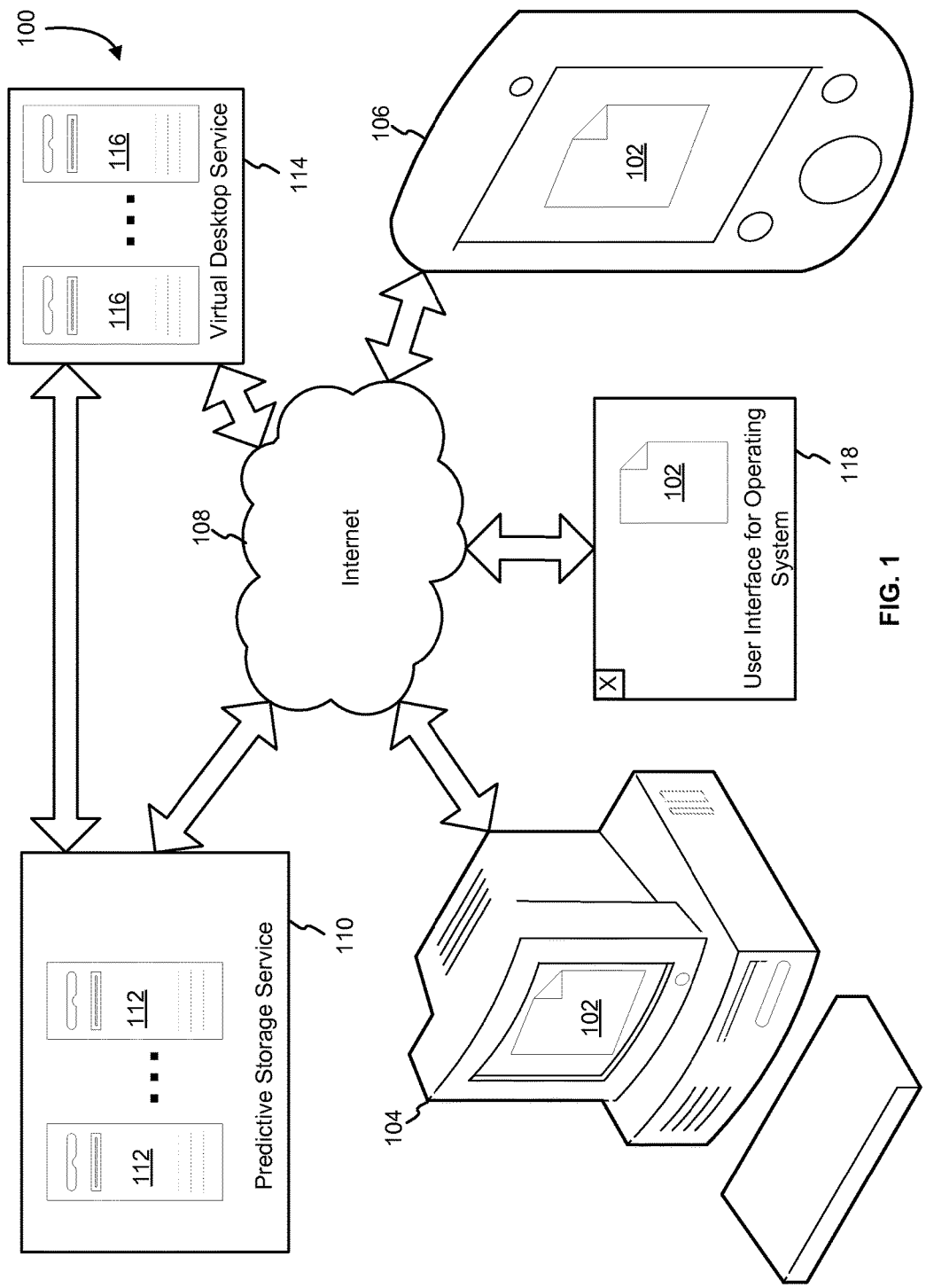
FIG. 1 shows an illustrative example of a predictive storage service in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include selectively determining files to send to a storage service from a file structure that makes the files available for use in another location. For example, a user may register computing systems, such as a desktop computer and a mobile device, to an account. The user may cause the desktop computer and/or mobile device to install a predictive storage application that monitors activity on these registered computing systems.

As one illustrative example, the predictive storage application may determine that the user downloaded and opened a PDF file on a laptop computer. While the PDF file is open on the laptop computer, the predictive storage application may receive a notice that the user also opened a word processing document. The predictive storage application may then receive events where a window focus shifts between the PDF and word processing document several times on the laptop computer. Upon a save event for the word processing document, the predictive storage application may determine that the PDF and the word processing document have enough importance based at least in part on the fact that the user interacted with the files and cause the PDF and word processing document to be sent to a predictive storage service. Once in the predictive storage service, the PDF and word processing document can be persisted or sent to a registered mobile phone. Any further changes to either the PDF or word processing document on the laptop computer may also be synchronized to the predictive storage application and/or mobile phone. When the user shuts down the laptop computer, the user may continue reviewing the PDF and editing the word processing document on the mobile phone.

The predictive storage application may monitor a file structure of a computing system. In one embodiment, a virtual desktop offered as a service includes a predictive storage application that monitors a file system. The file system may be based on a volume, object storage or other data container. The monitoring information may be determined through events, notifications, polling or other push or pull based information or combinations thereof. The monitoring information may be received from applications, operating systems, hypervisors, plug-ins and/or other sources of monitoring information of combinations thereof. For example, the application may register with an operation system to receive notifications when a file from a set of file types is opened, closed, created, modified and/or destroyed. In another example, the application may include a plug-in to a word processor that notifies the application upon a file open, close, save, autosave and/or rejection of an offer to save. In yet another example, the application may periodically scan a file structure in a volume for recent changes to modified, open, creation or other dates and information stored in the file structure. During the scan, other file metadata may be gathered, such as author, title, subject, tags, category, last saved username, revision number, version number, application name, creation date, last saved date, last printed date, last accessed date, date taken, date acquired, copyright, dimensions, width, height, resolution, compression, camera, ISO speed, serial number, file structure path, pages, words, characters, lines, paragraphs and/or size.

The predictive storage application may make a determination of which files to upload based at least in part on a quantified data inference algorithm. The algorithm may use importance indicators, such as heuristics to determine an importance of uploading a file. By determining which files are important to upload, uploading bandwidth and storage resources may be used more efficiently. For example, instead of uploading an entire file structure (or portion thereof), only identified files are uploaded. This selective uploading allows a predictive storage application to focus on the synchronizing of files having a measured importance, instead of forcing a user to store everything in a folder. This selective uploading also avoids the uploading of documents that may not be useful, such as temporary or administrative files. Using the gathered information about the file structure and/or files within the file structure, the predictive storage application may determine which files to upload to the storage service based on importance indicators. For example, an importance indicator may be a number of times a user has interacted with a file over time. An algorithm can be used to rate files according to the importance indicator. The application can be configured to upload the top X percent of files to the service (where X is a configurable variable). In another configuration, the algorithm can rank files and weight each file's rating to adjust its overall rating. For example, the monitoring program may use document type, file opening recency, length of time the file was open, change in overall size of the file from when it was opened to when it was closed, keywords and author information to determine importance indicators to calculate an importance rating of files. Files, having a word processing type, that have been recently opened by an author matching the machine login may receive higher importance ratings. Upload scheduling may also be prioritized by a determined importance. In another example, a determined importance may be based at least in part on installed applications on a computing system. In one embodiment, a file may be determined to have a relationship with an installed application if an icon is associated with the file's file type. For example, a "txt" file extension may have an association with an icon due to a word processing program providing an icon for all "txt" extension files. If the computing system has a word processor installed, but no spreadsheet, files related to word processing may gain in importance rating while files related to a spreadsheet may decrease in importance rating.

In one embodiment, the predictive storage service stores files. The predictive storage service may receive files from a registered computing system, such as through communication with a predictive storage application on the registered computing system. A registered computing system may be a computing system associated with a customer account. In one embodiment, a client may register with the predictive storage service to receive files related to a customer account. For example, a customer may install a software client on a computing system. As part of the installation, the software client may request account information, such as username and password or key, and register with the predictive storage service. The predictive storage service may then provide an identifier or key to the software client that may be used to identify the software client on future connections. In another embodiment, the predictive storage service may work with a virtual desktop service. A customer of the virtual desktop service can create an account with the provider of the service. A virtual machine including an operating system with the software client can be provisioned by the virtual desktop service and the graphical user interface generated by the operating system can be streamed to a client device. In this configuration, the software client can be pre-provisioned with account information to enable it to communicate with the predictive storage service.

The predictive storage service may then store the files. In one embodiment, the predictive storage service may provide other services related to the files. For example, the storage service may index the files such that searches may be performed to find files and/or information in files. The search may return snippets from the files with content both before and after the searched information. In another embodiment the predictive storage service receives and stores encrypted files. As the files are encrypted by the sending device, the predictive storage service may store the files and relay the files to other registered computing systems that may decrypt the files. Risk of breach may be mitigated by the fact that the storage service does not have access to the data, but only stores the encrypted payload. In another embodiment, a hybrid approach is taken where the encrypted payload is stored, but the predictive storage service also has the encryption key. In another hybrid approach, an encrypted payload is stored with an index to the encrypted payload.

In some embodiments, the stored files may be evicted from the predictive file service. The eviction may be based on current determined importance, use, space and/or time. For example, a file may be evicted on a time expiration model. If a stored file has not been accessed on a registered computing system for a span of time, the file may be evicted from the predictive storage service. In another example, a file may be evicted on a least recently used (LRU) model. If the predictive storage service determines that a file must be evicted from storage, the predictive storage service may select a file to evict that has the largest span of time since it was accessed. In other embodiments, the predictive storage service may receive or request importance ratings and/or importance indicators from registered devices for the files stored in the predictive storage service. These ratings may be used to determine which, if any, files are evicted from the storage service, such as files, having an importance rating, that do not pass a threshold or files that are low outliers from a statistical analysis of a distribution of importance ratings.

In some embodiments, the predictive storage service relays files to registered devices. The predictive storage service may act as an intermediary to distribute files. In one embodiment, the predictive storage service may temporarily store files while registered devices receive the file. In an embodiment, the predictive storage service facilitates a peer connection such that devices send files between each other and the predictive storage service does not store the files.

Turning now to FIG. 1, an illustrative example of a predictive storage service 100 in accordance with at least one embodiment is shown. In the embodiment shown, a file 102 accessed on a first computing system is transferred to a second computing system as facilitated by a predictive storage service 100 for further access by the user. The predictive storage service 100 may use importance indicators to make the determination of which files to transfer. For example, a user accesses a file 102, such as a word processing file, that is accessed on a desktop computer 104. A predictive storage application resident on the desktop computer 104 determines that the accessed file 102 is important to the user because the recent access to the file may be an importance indicator. In some embodiments importance is a computed from a set of importance indicators calculated by an algorithm or heuristic using several measurements. The measurements may include monitoring information and/or file metadata as described above. As the file 102 has a high enough determined importance, a predictive storage service 110 may be contacted. In some embodiments, the file may be sent to the predictive storage service 110 over the Internet 108. Using one or more servers 112, the predictive storage service 110 may store the file 102. In some embodiments, the predictive storage service 110 may then attempt contact with a mobile device 106 and send the file 102 to the mobile device, such as through a push notification or other push methodologies. In other embodiments, the mobile device 106 may contact the predictive storage service 110 and request an update from the predictive storage service 110 to receive the file 102. This request for an update from the mobile device 106 may be due to launching of a predictive storage application on the mobile device 106, a periodic polling request from the mobile device 106, an event on the mobile device 106 or other pull methodologies.

In other embodiments, the predictive storage service 110 may arrange for the file 102 to be sent directly to the mobile device 106. In one embodiment, registered devices may remain in contact with the predictive storage service 110. For example, when an important file is determined to be shared with other computing systems, a desktop system 104 may contact the predictive storage service 110 and retrieve contact information for other computing systems, such as mobile device 106. Depending on the configuration, the desktop system 104 may directly connect to mobile device 106, mobile device 106 may directly connect to desktop system 104, the predictive storage service 110 may act as a proxy or other connection between the desktop system 104 and mobile device 106 may be established. Using the connection, the desktop system 104 may send the file 102 to the mobile device 106.

The desktop and/or mobile device 106 may be registered with the predictive storage service 110. In one embodiment, a customer creates an account with the predictive storage service 110. The customer may then install an application on each computing system, such as the desktop computer 104 and mobile device 106. The application may cause the computing system to register with the predictive storage service 110 and associate the computing system with the customer account.

In another embodiment, the predictive storage service 110 may also work in conjunction with a virtual desktop service 114. For example, a service provider operating the virtual desktop service 114 can launch a virtual machine including an operating system for the user. A user interface 118 for the operating system can be streamed to a computing system operated by a user. The virtual desktop service 114 may include one or more physical machines 116 that provide one or more virtual machines that execute programs in the virtual machine and stream the user interface 118 for the operating system to a client. Inputs from the user interface 118 may be streamed to the virtual desktop service 114. For example, a virtual machine may export the graphical user interface of the operating system to a remote laptop and receive inputs of keyboard and mouse from the remote laptop. An example of an organization of virtual machines in a data center may be seen in FIG. 8. The virtual desktop service 114 may communicate through a network or over the Internet with the predictive storage service 110 to make the file available 102 to the user interface 118. In one embodiment, the virtual desktop environment may execute programs in a virtual machine that access and/or modify the file 102. The display of the virtual desktop service 114 may be exported for display on a client computing resource, while the processing of the file 102 and execution of desktop environment programs may occur within the virtual desktop service 114. Inputs, such as mouse, touch and/or keyboard may be communicated from the user interface 118 to the virtual desktop service 114.

In some embodiments, the predictive storage service 110 also provides access to the files 102 over a web interface. In an embodiment, the web interface includes download functionality to download the important file. In another embodiment, the web interface includes editing functionality to edit the file through the web interface. For example, a word processing document may be edited through the web interface due to a word processing web application made available through the web interface. Other file types and applications may also be made available, such as a spreadsheet web application for spreadsheet file types or an audio player for audio file types. In some embodiments, a convertor may also be used to convert a file type from one type to another to facilitate usability. For example, an audio file may be converted from a less supported file type to a more common file type or a file type supported by a client browser.

Figure 2:
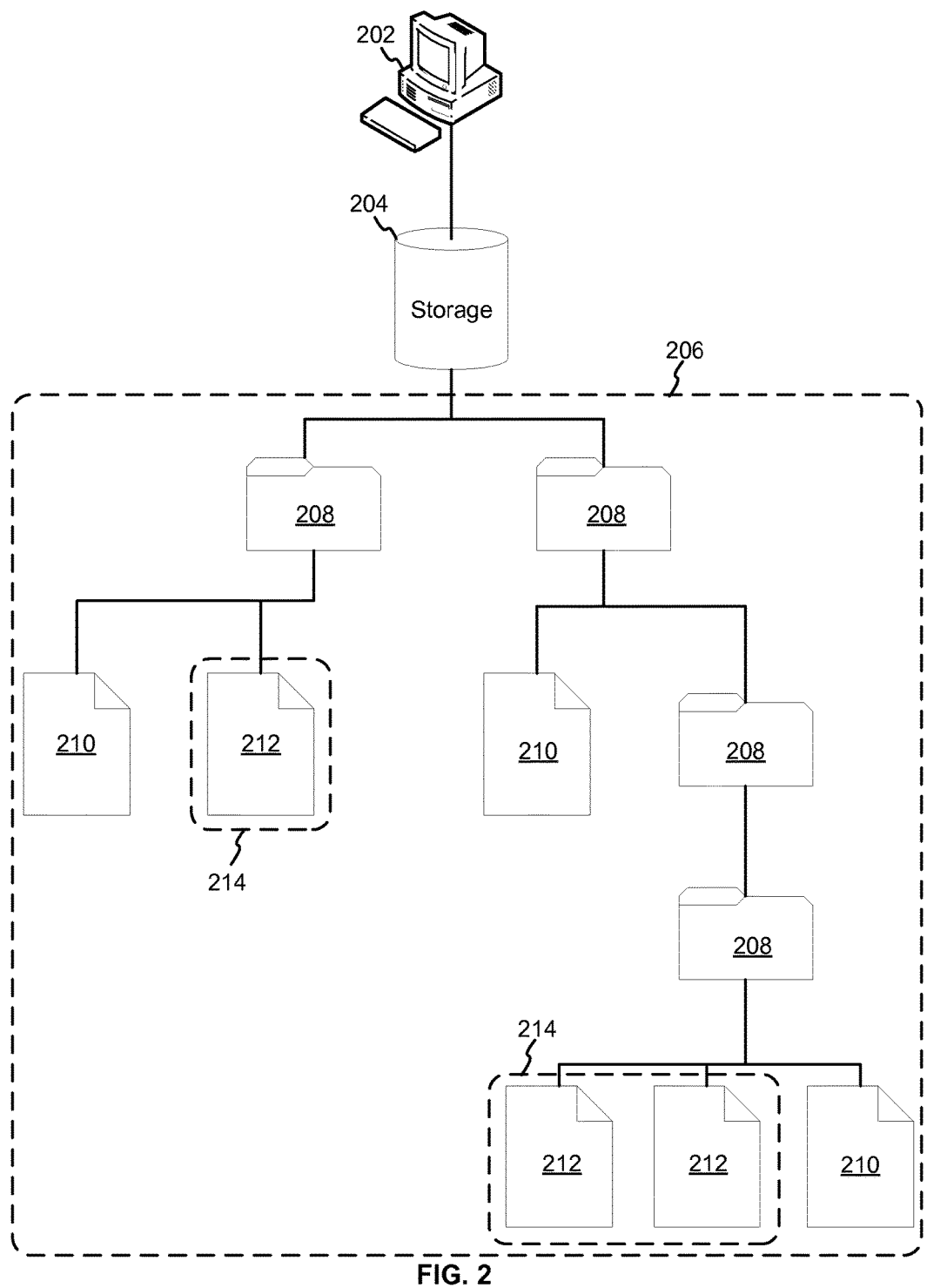
FIG. 2 shows an illustrative example of a predictive storage service using a file structure in accordance with at least one embodiment.

Turning now to FIG. 2, an illustrative example of a predictive storage service using a file structure 206 in accordance with at least one embodiment is shown. A file structure 206 may be monitored for important files 212 that may be identified through monitoring information and file metadata. Other files 210 may be deemed less important. For example, a predictive storage application on a computing system 202 may monitor storage 204 connected to the computing system 202. In the embodiment shown, the storage 204 comprises a file structure 206 with a hierarchical nature. Folders 208 may contain other folders 208 and/or files 210 and/or 212. The predictive storage application may register to be notified of file events and/or scan the file structure 206 from time to time.

For example, a predictive storage application may be installed on a computing system 202 to run as a background service. The predictive storage application may monitor storage 204, such as a hard drive volume, for monitoring information and file metadata as described above. The predictive storage application may determine an importance rating for identified files based on importance indicators prepared from the scan and/or the file events. Using the importance rating, a set 214 of important files 212 is determined and sent to the predictive storage service. In one example, a decreasing importance indicator score, starting at 5 points minus 1 point for 24 hours has passed, is given. Two points may be given for an editable file, while one point is given for a document containing text. Files having a six or greater importance score may be determined to be important, while scores at five or less may not be sent to the predictive storage service.

In some embodiments, the files are encrypted. In one embodiment, the files are sent over TLS/SSL. In other embodiments the files are encrypted before leaving the computing system 202 for storage as an encrypted file. By encrypting the files, the predictive storage application may reduce the risk of interception and/or breach of confidential information.

The predictive storage application may be configured by a user and/or administrator to include and/or exclude files, file types, folders, monitoring information and file metadata. In one embodiment, an administrator may configure the predictive storage application for a set of business computing systems. Important files may be sent to team member computing systems so that team members may view up-to-date information that was determined to be relevant to at least another team member.

Figure 3:
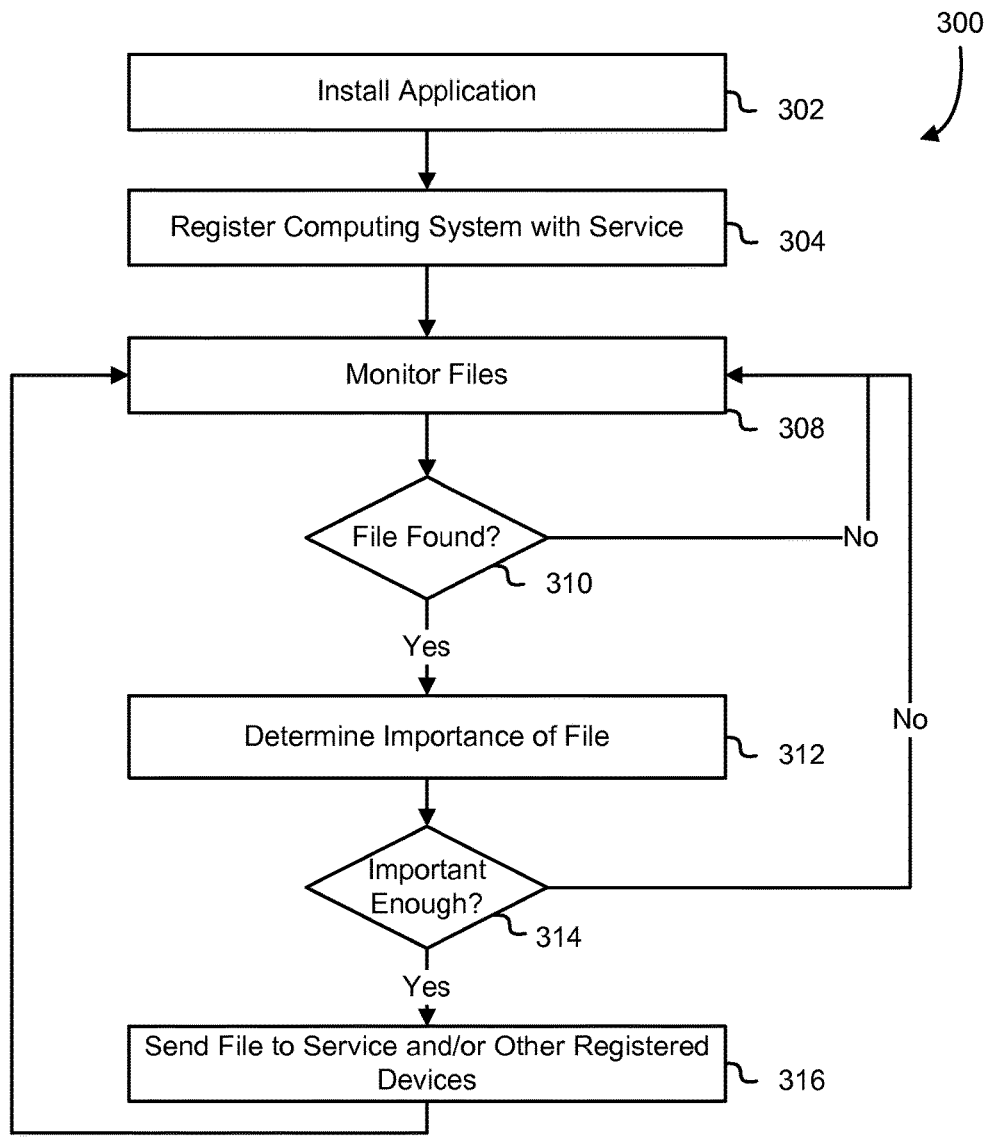
FIG. 3 shows an illustrative example of a process that may be used to synchronize files with predictive storage service in accordance with at least one embodiment.

Turning now to FIG. 3, an illustrative example of a process 300 that may be used to synchronize files with predictive storage service in accordance with at least one embodiment is shown. The process 300 may be accomplished through use of one or more of the computing resources found in FIG. 1, such as the desktop computer system 104, mobile device 106, file 102, predictive storage service 110, Internet 108 and servers 112. A predictive storage application may be installed 302 on a computing system. The computing system may be registered 304 with the predictive storage service. For example, as part of installation, a software client may contact the predictive storage service and provide credentials, such as a username and password or digital key, that may be used to identify the client as associated with a customer account. The software client may be given a set of credentials, such as a key, by the predictive storage service to use to identify the client. In other embodiments, a MAC address, hash of one or more identifying information or other identifying information about the system may be used to register with the predictive storage service and identify the client. Other systems may also be added by installing an application suited to the operating system and registering the devices with the predictive storage service. The predictive storage application(s) may monitor 308 files for measurements and/or events that are determined as indicative of potential importance of the files. In some embodiments, events may be used to measure user interaction with a file. If no important file is found 310, and no new systems need 306 to be registered, the files may be continued to be monitored 308. If a potentially important file is found 310, the importance of the file may be calculated 312. For example if the predictive storage application received an event that a word procession file was saved, the predictive storage application may react and determine an importance rating of the file. If 314 the rating indicates the file is important enough, the file may be sent 316 to the predictive storage service and be caused to be sent to other registered devices. The process may then repeat starting at block 306. However, if the file is not 314 important enough, the process may repeat starting at block 306. It should also be noted that other devices may be added at various times, including at a later time.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

It should be noted that while specific examples of processes are shown, portions of process operations may be performed in parallel instead of series. For example, sending 316 the file to the service and sending 318 to registered devices may be performed in parallel. In another example, installing 302 the application and registering 304 the computing system may be performed in parallel on separate computing systems.

In another example, a first device may determine a first file is important and a second device may determine that second file is important. The first device may cause the first file to be synchronized to the predictive storage service and/or the second device. The second device may cause the second file to be synchronized to the predictive storage service and/or the first device. As a result, the first file and second file may be stored by the predictive storage service and/or both the first and second devices.

Figure 4:
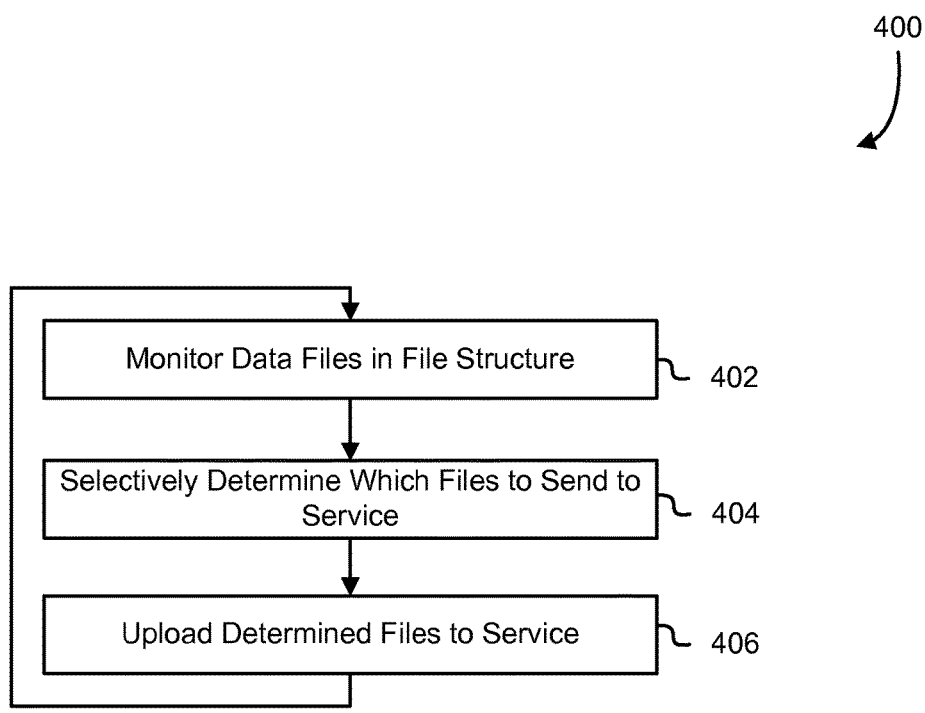
FIG. 4 shows an illustrative example of a process that may be used to determine files to select in a predictive storage service in accordance with at least one embodiment.

A responsibility of predictive storage application on a computing system may be to determine which files should be made available outside of the computing system, such as in the predictive storage service or on other devices. FIG. 4 shows an illustrative example of a process 400 that may be used to determine files to select in a predictive storage service in accordance with at least one embodiment. The process 400 may be accomplished through use of one or more of the computing resources found in FIG. 1, such as the desktop computer system 104, mobile device 106, file 102, predictive storage service 110, Internet 108 and servers 112. A predictive storage application resides on a computing system. The predictive storage application monitors 402 a file structure for indications that a file should be shared outside of the computing system. Using an algorithm and/or heuristics based on the monitoring and/or other information, such as file metadata, the predictive storage application may selectively determine 404 which files to send to the predictive storage service. For example, an importance rating may be increased by attributes such as a file having been recently opened, recently saved and having a word processing extension. If the importance rating is high enough, the file may be selected to send to the predictive storage service. Once selected, the files may be uploaded 406 to the predictive storage service. For example, the predictive storage application may make an application programming interface call to the predictive storage service using a secure communication channel such as TLS/SSL. In some embodiments, the file may be encrypted on the computing system by the predictive storage application before sending to the predictive storage service.

Figure 5:
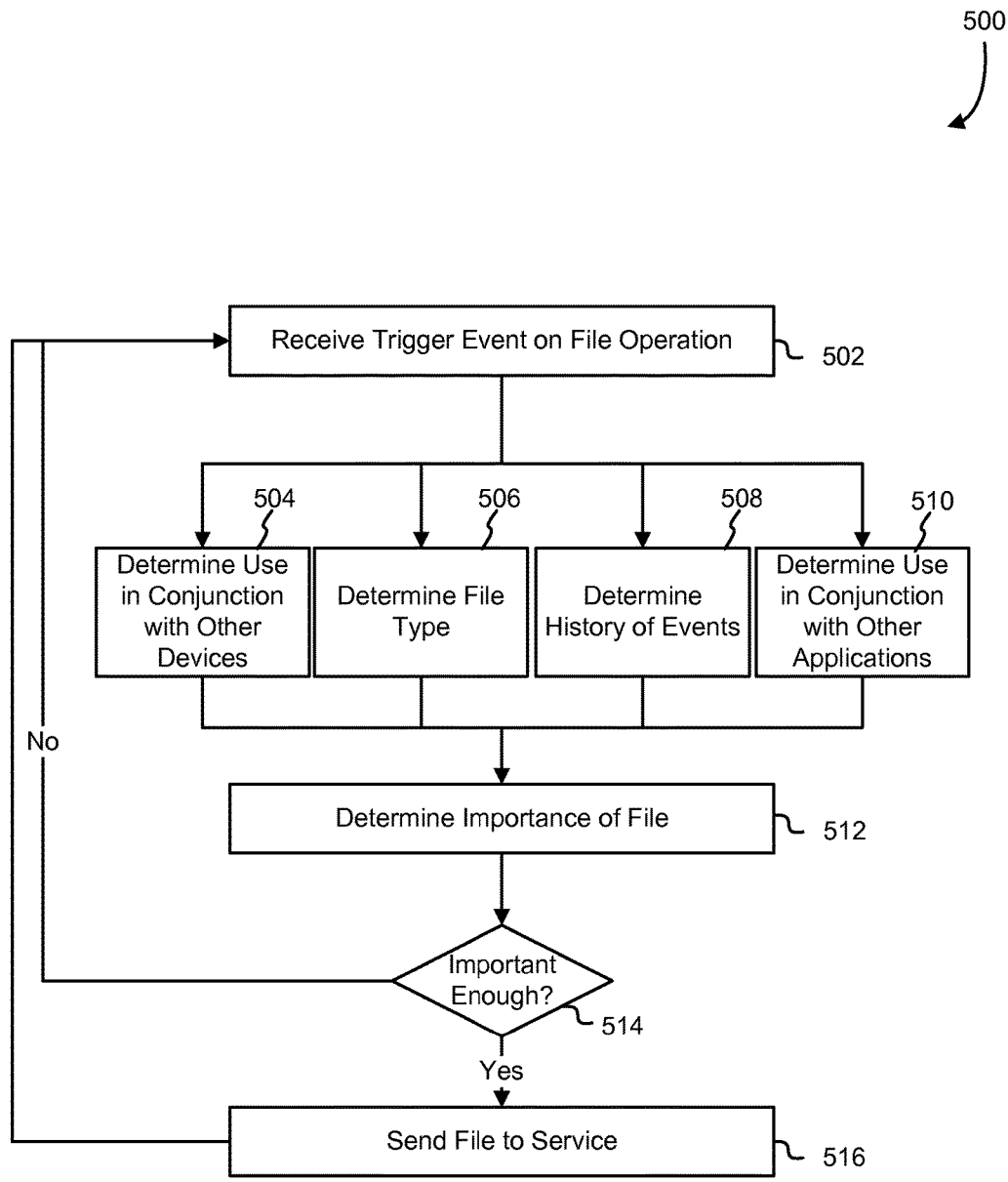
FIG. 5 shows an illustrative example of a process that may be used to determine files to select in a predictive storage service in accordance with at least one embodiment.

In one embodiment, shown in FIG. 5, the monitoring may include event-based monitoring. The process 500 may be accomplished through use of one or more of the computing resources found in FIG. 1, such as the desktop computer system 104, mobile device 106, file 102, predictive storage service 110, Internet 108 and servers 112. The predictive storage application may receive 502 an event notification of a file operation that triggers a determination of importance of a file related to the file operation. Before a determination may be made, information about the file may be gathered. In the embodiment shown, a use of the file across other devices may be determined 504, such as opening, saving or deletion of the file. A file type may be determined 506. In some embodiments, files that may be commonly used, such as word processing documents, spreadsheets, pictures and/or documents, may be given greater importance than files that are not normally used, such as configuration files, backup files and/or executable files. A history of events related to the file may be determined 508. For example, if the file had multiple saves in the last day, multiple opening events and/or a duration of active window time exceeds a threshold, then the importance rating of the file may be increased. A use of the file in conjunction with other applications may be determined 510. For example, an importance rating of the file may be increased when the file is open in conjunction with another file of importance. In another example, changing focus between a file that already has a determined importance and the file under examination may increase the file under examination's importance rating. Other considerations may also be used, as this gathered information from operations 504 to 510 are examples of potential information gathering. Using the gathered information, an importance rating of the file may be determined 512. If determined 514 to be important enough, the file may be sent to the service 516 and then the process repeats at operation 502. If the file is not 514 important enough, the predictive storage application may return to await a new event at operation 502.

In some embodiments, the importance ratings may be tailored to the needs of a client. In one embodiment, the predictive storage system may be used with a user. The user may configure documents to include, or exclude, folders to include or exclude folders (such as system folders) and determine whether to include temporary volumes, such as a USB drive. Importance rating calculations may also be configured. For example, a photographer may be more interested in images than documents, while a patent attorney may be more interested in documents and technical drawings than images. The predictive storage application may include a default configuration.

In another embodiment, the predictive storage system may be used in a corporate or team environment with an administrator. Files uploaded to the predictive storage service may respect file permissions given to users of the files. For example, a file that is read-only to the team, but is determined to be important, may remain in a read-only condition. If needed, the file may be converted to a format that respects the read only condition on a device that receives the document, such as converting a word processing document to a set of images. In another example, permissions may be respected by the predictive storage service only distributing the file deemed important to team members that have permission to view and/or edit the document.

Figure 6:
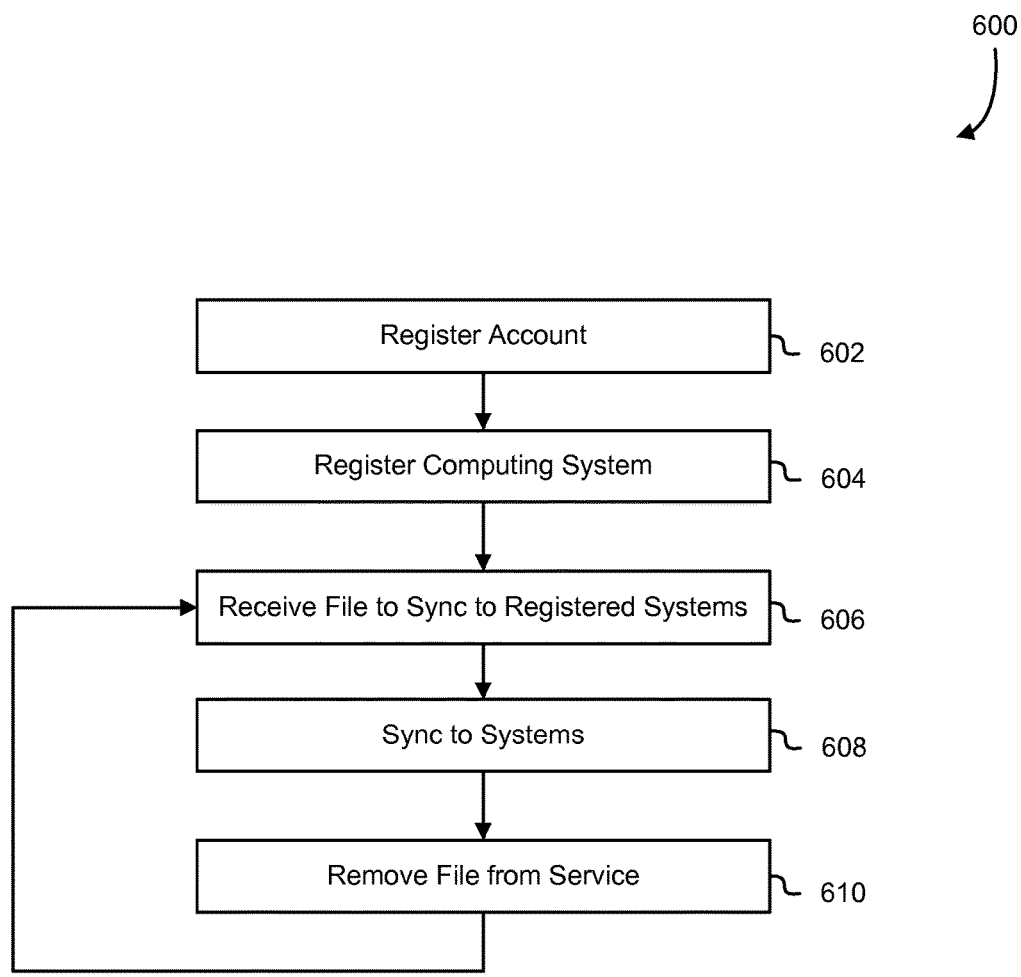
FIG. 6 shows an illustrative example of a process that may be used to synchronize files in a predictive storage service in accordance with at least one embodiment.

In some embodiments, a predictive storage service may facilitate communicating files between devices rather than act as a repository for files. In FIG. 6, an illustrative example of a process 600 that may be used to synchronize files in a predictive storage service in accordance with at least one embodiment is shown. The process 600 may be accomplished through use of one or more of the computing resources found in FIG. 1, such as the desktop computer system 104, mobile device 106, file 102, predictive storage service 110, Internet 108 and servers 112. The predictive storage service may register 602 an account to a customer. A client may reference the account and register 604 a computing system. If more computing systems are available, they may also be registered, as the registration process may be performed multiple times with multiple devices. The predictive storage system may receive 606 a file to synchronize to other registered systems. In some embodiments, the file may be received from a predictive storage application running on the registered system. In one embodiment, the received file is encrypted. In another embodiment, the encryption key is known to the registered systems, but is not known to the predictive storage service.

After receiving 606 the file, one or more registered devices or systems may synchronize 608 the file. In some embodiments, the predictive storage service may attempt to synchronize the file until success is achieved. Other registered systems may also be synchronized. Once all systems have been synchronized, the file may be removed 610 from the service. In one embodiment, the predictive storage service may not actually store the file, but cause synchronization to occur between devices. For example, a first computing system may receive an address of a second computing system with which to synchronize the file. In this way, the predictive storage system serves as an address book for synchronization. In some embodiments, because registered computing systems change networks or are behind a firewall, a predictive storage application on a computing system may periodically update an address at which it may be contacted.

Figure 7:
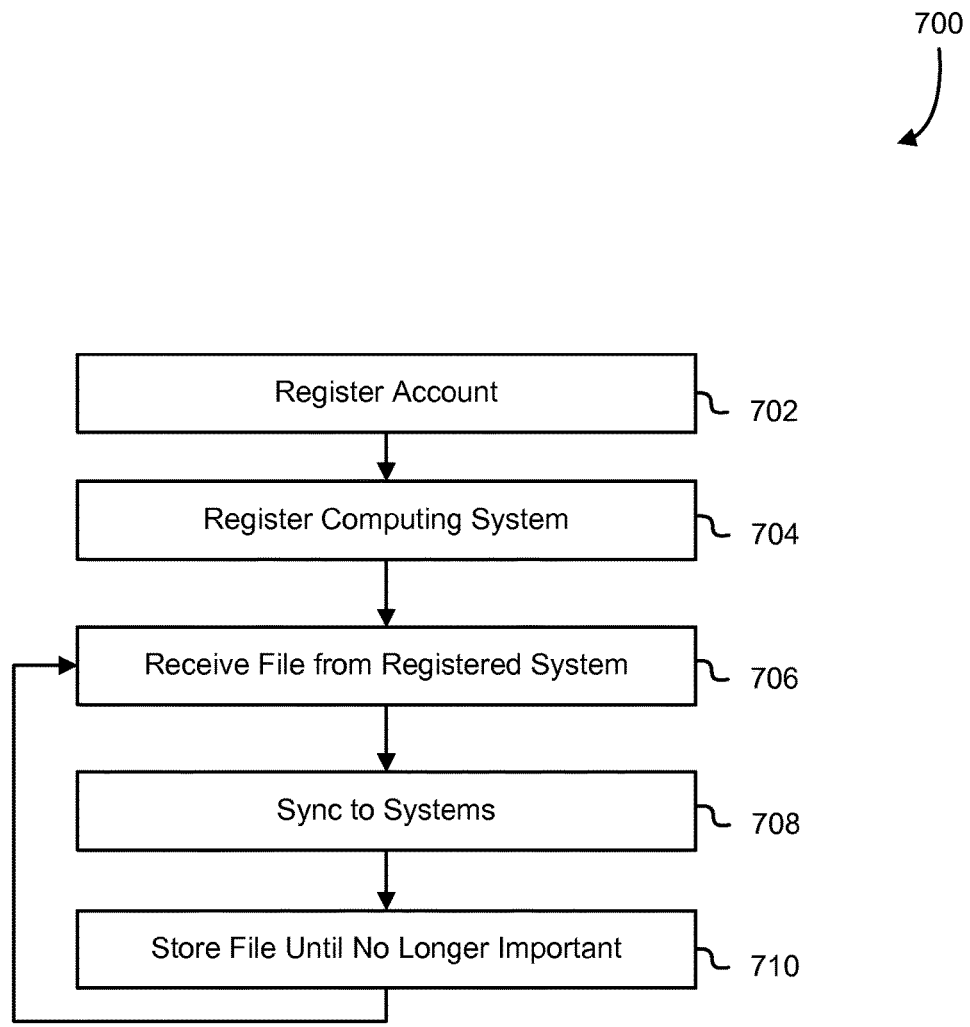
FIG. 7 shows an illustrative example of a process that may be used to store files in a predictive storage service in accordance with at least one embodiment.

In some embodiments, a predictive storage service may act a repository for files that may be retrieved by registered computing systems. In FIG. 7, an illustrative example of a process 700 that may be used to store files in a predictive storage service in accordance with at least one embodiment is shown. The process 700 may be accomplished through use of one or more of the computing resources found in FIG. 1, such as the desktop computer system 104, mobile device 106, file 102, predictive storage service 110, Internet 108 and servers 112. The predictive storage service may register 702 an account to a customer. A client may reference the account and register 704 a computing system. If more computing systems are available, they may also be registered. The predictive storage system may receive 706 a file from a registered computing system to store. The predictive storage service may select one or more registered computing systems with which to synchronize 708 the file and, if needed, attempt to synchronize the file until successful. In some embodiments the synchronization of multiple devices may be accomplished in parallel. The file may be stored 718 in the predictive storage service until it is determined that the file is no longer important.

Files may be expunged from the predictive storage service depending on the configuration of an embodiment. In some embodiments, an LRU algorithm expunges the oldest accessed file based on a storage quota, such as size, number of files or other measurement of storage. In other embodiments, registered devices may be queried for an importance rating of stored files. Files that drop below a threshold of importance may be expunged from the predictive storage service. In one embodiment, the importance rating may be determined by accesses and time held by the predictive storage service.

In some embodiments, the files may be removed from synchronized devices except for the originating device. For example, synchronized files may be stored in a temporary folder. An original of a file may reside on a file structure of a computing system. Depending on device requirements, the temporary folder may expunge files at a different time and manner than the predictive storage service. In some embodiments, the expunging of files from the temporary folder may be based on an importance rating and/or configuration of a predictive storage application running on the device. In other embodiments, the expunging of files from the temporary folder may be controlled by the predictive storage service.

In other embodiments, the predictive storage service also provides other services. For example, the predictive storage service may provide search services that index the received files. Upon request, the index may be consulted to search among the stored files. In another example, the predictive storage service may provide access to a file, such as through a download or web application. For example, a word processing web application may provide editing access to a file.

In one embodiment, the predictive storage service may include versions of important files. For example, a user may edit a file on a mobile device late at night. The next morning the user may regret the late night changes. In a drop-down box, the user may select a prior version to synchronize to a computing system and receive the prior version. If the file was deleted, the prior version may be used to restore the file. In another embodiment, the versions may be obtained through autosave features of an application. For example, a user may work on a file for several hours. The autosave files, such as differential files, may be uploaded to the predictive storage service for use on other computing systems. If the user causes the computing system to sleep and then moves to a second computing system, the user may still continue editing from a last autosave, even if the file was not technically saved by the application on the prior computing system. In an embodiment, a prior autosave may also be selected as a prior version. Depending on the computing system and the autosave, the predictive storage service may use the original file and autosave file to present an accurate reproduction of the version selected.

In some embodiments, the predictive storage service may determine to update an existing file stored by the predictive storage service rather than create a new copy of the existing file. The predictive storage service may use internal analysis of files or rely on a client agent for analysis of files. In one internal analysis embodiment, a predictive storage application on a local computing device has previously determined that a file has a sufficient importance rating and uploaded the file to the predictive storage service. The predictive storage application may then determine that the file should be analyzed relative to a version of the file stored by the predictive storage service. Using an understanding of the file format, the predictive storage application may analyze and interpret data within the file to determine whether the file is current, modified or an old version. If changed, the predictive storage application may prepare an update to the file in the predictive storage service. By sending an update, the entire file need not be sent, saving bandwidth.

In a client agent embodiment, a predictive storage application on a local computing device has previously determined that a file has a sufficient importance rating and uploaded the file to the predictive storage service along with a unique identifier from a client agent. The predictive storage application may then determine that the file should be analyzed relative to a version of the file stored by the predictive storage service. This determination may be a based on a periodic scan or event, such as a local save event or an upload event of the file at the predictive storage service. The predictive storage application may receive a unique identifier from a client agent that has performs an analysis on the file. The unique identifier may be transmitted to the predictive storage service to allow the predictive storage service to determine whether the file is a new version, current version or old version of the file. If new, the predictive storage application may upload the file to the predictive storage service. If old, the predictive storage service may request the current version of the file.

Updated versions of files may be stored by the predictive file service. In some embodiments, an updated version of a file is stored in a tree-structure with other versions and/or branches of versions. In other embodiments, a new version overwrites an old version. Versions of files may also include a unique identifier metadata. The unique identifier metadata may provide information about whether a version of a file is old, new or current compared with the version stored by the predictive file service. For example, a unique identifier may include an auto-incremented value, time stamp and change author identifier. In this example, a newest version may be determined by the auto-incremented value. If the unique identifier is the same then the files may be considered current. However, if the auto-incremented value is the same, but the other fields do not match, there may be conflicting edits.

Figure 8:
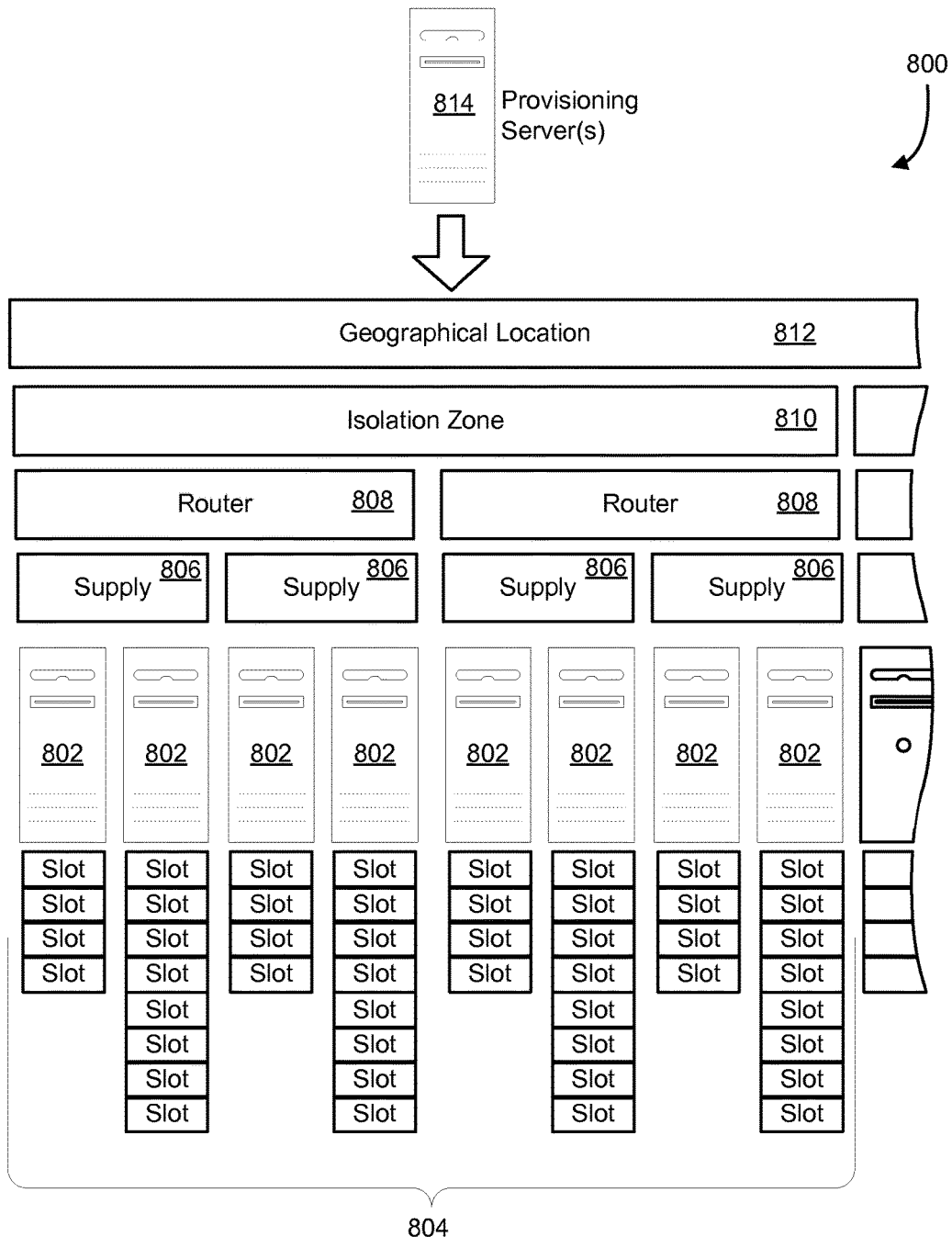
FIG. 8 shows an illustrative example of data center organization in accordance with at least one embodiment.

FIG. 8 illustrates aspects of a data center environment 800 that may be used to support a predictive storage service and/or a streaming desktop service. A data center 800 may comprise a collection of shared computing resources and/or shared infrastructure. For example, as shown in FIG. 5, a data center 800 may include virtual machine slots 804, physical hosts 802, power supplies 806, routers 808, isolation zones 810 and geographical locations 812. A physical host 802 may be shared by multiple virtual machine slots 804, each slot 804 capable of being used to host a virtual machine including a guest operating system. Multiple physical hosts 804 may share a power supply 806, such as a power supply 806 provided on a server rack. A router 808 may service multiple physical hosts 804 across several power supplies 806 to route network traffic. An isolation zone 810 may service many routers 808, the isolation zone 810 being a group of computing resources that are serviced by redundancies such as backup generators. Multiple isolation zones 810 may reside at a geographical location 812, such as a data center 800. One or more provisioning servers 814 may include a memory and processor configured with instructions to analyze user data and rank available implementation resources using determined roles and/or shared resources/infrastructure in the calculation. The provisioning server 814 may also manage workflows for provisioning and deprovisioning computing resources as well as detecting health and/or failure of computing resources.

In one embodiment, a streaming desktop may be instantiated as a virtual machine in an available slot 804. As part of the provisioning process, the slot 804 may also be linked to the predictive storage service and/or an account with the predictive storage service. Files stored with the predictive storage service may be made available to the streaming desktop service in addition to or in place of other storage services, such as block storage, object storage and/or other high or low latency data stores. Display output of the operating system may be routed through the physical host 804 and router 808 to an external computing system. Input may be routed to the host 802, into the virtual machine and provided to the operating system.

Figure 9:
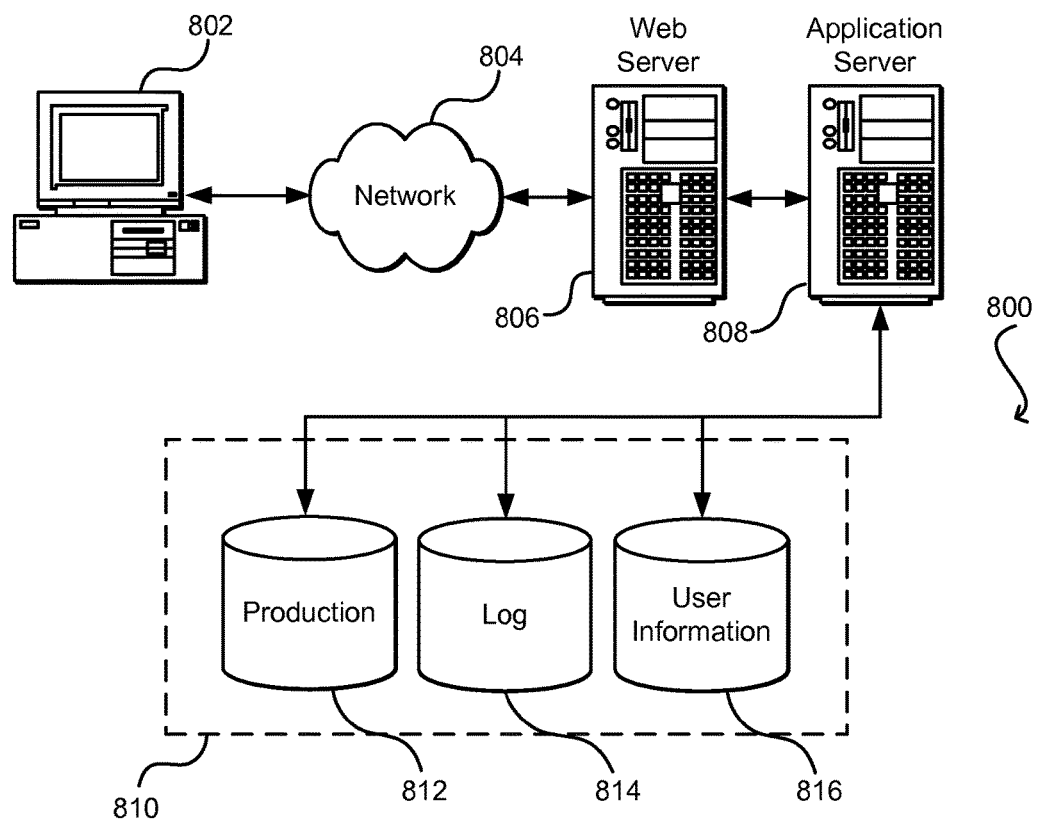
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing data, comprising:
    running, by a service provider, a virtual machine including an operating system within a multi-tenant environment for a customer of the service provider;
    monitoring the operating system for access of data files in a file structure of the operating system;
    determining importance indicators for at least a portion of the data files in the file structure, each importance indicator determined based at least in part on:
    recent accesses to a respective data file in the file structure;
    a user interaction event stored in a log;
    a relationship between a first use of the respective data file by a first application during a computing session and a second use of a different data file in the file structure by a second application during the computing session, the first application and the second application accessible by the virtual machine during the computing session; and
    a first importance rating for the different data file;
    calculating a second importance rating for at least the portion of the data files based at least in part on the importance indicators; and
    uploading at least the portion of the data files from the file structure to a storage service based at least in part on the importance indicators such that the uploaded data files become cached on a server for distribution to other computing devices.

2. The computer-implemented method of claim 1, wherein the importance indicators are based at least in part on a bloom filter.

3. The computer-implemented method of claim 1, further comprising causing multiple versions of the uploaded data files to be made available on a second computing system.

4. The computer-implemented method of claim 1, further comprising causing removal of one or more of the uploaded data files on the server based at least in part on a second determination of importance indicators of the one or more of the uploaded data files.

5. The computer-implemented method of claim 1, further comprising causing a supplemental data file supporting an uploaded data file with the uploaded data file to be cached at the server.

6. The computer-implemented method of claim 1, further comprising:
monitoring the virtual machine for one or more changes to the uploaded data files; and
uploading, to the server, the one or more changes to the uploaded data files to form one or more new versions of the uploaded data files.

7. The computer-implemented method of claim 1, wherein the user interaction event comprises shifting between the respective data file and a separate data file.

8. The computer-implemented method of claim 1, wherein the user interaction event is generated in response to user interaction with the respective data file using at least one of the first application or the second application.

9. The computer-implemented method of claim 1, wherein:
the method further comprises analyzing, based at least in part on a file format associated with a data file of the portion of the data files, data within the data file to determine a version status of the data file; and
uploading at least the portion of the data files from the file structure to the storage service is further based at least in part on the version status.

10. The computer-implemented method of claim 1, wherein the relationship between the first use of the respective data file and the second use of the different data file is indicative of importance of the respective data file when the first importance rating of the different data file exceeds a threshold.

11. The computer-implemented method of claim 1, wherein the relationship between the first use of the respective data file and the second use of the different data file is indicative of a high importance of the respective data file when the first use and the second use comprise changing focus between the different data file and the respective data file during the computing session.

12. A computer-implemented method for data storage, comprising:
under the control of one or more computer systems configured with executable instructions,
monitoring data files of a first computing system;
determining an importance of one or more data files using a quantified data inference algorithm based at least in part on:
a user interaction event corresponding to a respective data file of the one or more data files, the user interaction event stored in a data structure;
a relationship between first user interaction events corresponding to use of the respective data file by a first application during a computing session and second user interaction events corresponding to use of a different data file by the first application or a second application during the computing session, the first application and the second application accessible by the first computing system during the computing session; and
a first importance rating for the different data file;
determining a set of data files from the one or more data files to send to a storage service based at least in part on a second importance rating for the set of data files that is calculated based at least in part on the determined importance of the one or more data files; and
causing the set of data files to be uploaded for availability of the set of data files on other computing devices.

13. The computer-implemented method of claim 12, wherein the second importance rating is further based at least in part on metadata describing the set of data files.

14. The computer-implemented method of claim 13, wherein the metadata comprises document type, document access history, document edit history, keywords, or author information.

15. The computer-implemented method of claim 12, wherein the quantified data inference algorithm is based at least in part on recency of access of a data file from the one or more data files.

16. The computer-implemented method of claim 12, further comprising receiving an address of a second computing device registered to an account of the storage service to enable transmission of the set of data files to the second computing device.

17. The computer-implemented method of claim 12, further comprising causing the set of data files to be stored by the storage service.

18. The computer-implemented method of claim 17, further comprising indexing the set of data files to enable searching of the set of data files.

19. The computer-implemented method of claim 17, wherein causing the set of data files to be uploaded further comprises encrypting the set of data files such that the set of data files is stored in encrypted form at the storage service.

20. The computer-implemented method of claim 12, wherein the second importance rating is further based at least in part on a file event or file attribute.

21. A computer system for data storage, comprising:
one or more computing resources having one or more processors and memory including executable instructions that, when executed by the one or more processors, cause the one or more processors to implement at least:
a first application of a first computing system, the first application configured to:
determine an importance of a set of data files in a data structure to send to a storage service based at least in part on:
identifying a user interaction event corresponding to a respective data file of the set of data files, the user interaction event stored in a log; and
identifying a relationship between first user interaction events corresponding to use of the respective data file by a second application of the first computing system during a computing session and second user interaction events corresponding to use of a different data file in the data structure by a third application of the first computing system during the computing session, the second application and the third application accessible to the first computing system during the computing session, the different data file being associated with a first importance rating;

calculate a second importance rating of the set of data files based at least in part on the determined importance of the set of data files; and upload the set of data files from the first computer system to a storage service based at least in part on the second importance rating; and a fourth application of a second computing system configured to receive the set of data files from the storage service, wherein the storage service is configured to manage synchronization of the set of data files between the first computing system and the second computing system.

22. The computer system of claim 21, wherein the second computing system is a mobile phone.

23. The computer system of claim 21, wherein the first computing system further comprises a volume containing a file structure and wherein the data structure is a file structure.

24. The computer system of claim 21, wherein the storage service further comprises a web application that provides an editor for at least one data file from the set of data files stored by the storage service.

25. The computer system of claim 21, further comprising a search service that indexes the set of data files stored by the storage service and provides a search interface.

26. One or more non-transitory computer-readable storage media having collectively stored thereon executable instructions that, when executed by one or more processors of a computer system, cause the computer system to at least:

determine an importance of data files of a first computing system based at least in part on:

a user interaction event corresponding to a respective data file of the data files, the user interaction event stored in a log; and a relationship between first user interaction events corresponding to use of the respective data file by a first application of the first computing system during a computing session and second user interaction events corresponding to use of a different data file by a second application of the first computing system during the computing session, the first application and the second application accessible by the first computing system during the computing session, the different data file being associated with a first importance rating;

calculate a second importance rating of the data files based at least in part on the determined importance of the data files;

determine a set of data files of the data files from the first computing system to send to a storage service based at least in part on the second importance rating of the data files; and upload the set of data files to a storage service that associates the first computing system and a second computing system and is configured to transmit the uploaded set of data files to the second computing system.

27. The one or more non-transitory computer-readable storage media of claim 26, wherein the instructions further comprise instructions that, when executed, cause the computer system to at least temporarily store the set of data files; and wherein transmitting the uploaded set of data files further comprises distributing the set of data files to the second computing system.

28. The one or more non-transitory computer-readable storage media of claim 26, wherein the instructions further comprise instructions that, when executed, cause the computer system to at least restrict the set of data files to a subset of the set of data files based at least in part on permissions granted to a user of the second computing system.

29. The one or more non-transitory computer-readable storage media of claim 26, wherein the set of data files is a list of data files determined to be sent to the second computing system; and wherein uploading the set of data files further comprises receiving an address of the second computing system to facilitate direct communication of the set of data files to the second computing system by the first computing system.

30. The one or more non-transitory computer-readable storage media of claim 26, wherein the set of data files contains a subset of the set of data files in a folder with at least one file from the set of data files in the folder being outside of the subset.

* * * * *